(12) United States Patent
Li et al.

(10) Patent No.: US 8,880,676 B1
(45) Date of Patent: **\*Nov. 4, 2014**

(54) RESOURCE PLANNING FOR COMPUTING

(71) Applicant: Amazon Technologies, Inc., Reno, NV (US)

(72) Inventors: Xiao Yu Li, Seattle, WA (US); Diwakar Gupta, Redmond, WA (US); Akshay Kumar Reddy Katta, Seattle, WA (US); Sergey Krasnovsky, Sammamish, WA (US); Kalyanaraman Prasad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,149

(22) Filed: Nov. 14, 2013

Related U.S. Application Data

(63) Continuation of application No. 12/751,032, filed on Mar. 31, 2010, now Pat. No. 8,612,596.

(51) Int. Cl.
*G06F 15/173* (2006.01)
*G06Q 30/02* (2012.01)

(52) U.S. Cl.
CPC .................................. *G06Q 30/0202* (2013.01)
USPC .............................. 709/223; 709/226; 705/5

(58) Field of Classification Search
USPC ...................................... 709/223, 226; 705/5
See application file for complete search history.

(56) References Cited

U.S. PATENT DOCUMENTS

| | | | |
|---|---|---|---|
| 6,463,454 | B1 | 10/2002 | Lumelsky et al. |
| 7,512,940 | B2 | 3/2009 | Horvitz |
| 8,271,653 | B2 | 9/2012 | DeHaan |
| 2006/0089886 | A1 | 4/2006 | Wong |
| 2007/0043860 | A1 | 2/2007 | Pabari |
| 2009/0300608 | A1 | 12/2009 | Ferris et al. |
| 2010/0153157 | A1 | 6/2010 | Wade et al. |
| 2011/0219372 | A1 | 9/2011 | Agrawal et al. |
| 2012/0131594 | A1 | 5/2012 | Morgan |

*Primary Examiner* — David Lazaro
*Assistant Examiner* — Marie Georges Henry
(74) *Attorney, Agent, or Firm* — Thomas | Horstemeyer, LLP

(57) ABSTRACT

Disclosed are various embodiments for the planning of resources used in computing. Usage statistics regarding one or more virtual machine instances executing in a networked plurality of computing devices are obtained. The usage statistics are grouped, for example, based on one or more customer usage classifications, thereby producing one or more usage groups. A corresponding demand forecast is generated for each of the usage groups. A projected demand for one or more physical components of the networked computing devices is calculated according to the demand forecasts.

20 Claims, 4 Drawing Sheets

RESOURCE PLANNING FOR COMPUTING

CROSS-REFERENCE TO RELATED APPLICATIONS

This application is a continuation of, and claims priority to, co-pending U.S. Patent Application entitled "RESOURCE PLANNING FOR COMPUTING," filed on Mar. 31, 2010, and assigned application Ser. No. 12/751,032, which is incorporated herein by reference in its entirety.

BACKGROUND

Many forms of shared computing resources have been implemented. For example, a web server executing on a single computing device may be shared among a multitude of different customers. Such customers may purchase web hosting plans that include varying amounts of computing resources such as, for example, processing capacity, memory, data storage, network bandwidth, and so on. It is not always the case that computing resources included in a web hosting plan are reserved for all customers.

To illustrate, a web hosting provider may allocate ten customers to one web server, with each customer being promised an allocation of 100 gigabytes (GB) of data storage. The web server may provide 500 GB of data storage, even though the web hosting provider has promised the customers a total of 1,000 GB of data storage. The customers may not be using their entire promised allocation simultaneously, making the 500 GB of actual data storage resource efficient. However, when the available data storage of the web server drops below a threshold, for example, 200 GB, the web hosting provider may need to install additional data storage capacity in the web server or reallocate customers to other web servers with spare capacity.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to resource planning for a computing resource such as, for example, a cloud computing resource. In various embodiments, a cloud computing resource may comprise a multitude of networked computing devices executing instances of virtual machines associated with customers. Customers may be capable of terminating machine instances or launching machine instances whenever they desire, thereby providing an elastic computing resource. Such customers may be characterized, for example, as having a stable usage pattern, an unstable usage pattern, or some other usage pattern. Embodiments of the present disclosure seek to plan an inventory of computing devices and components in order to meet the computing resource consumption needs of the various types of customers. In the following discussion, a general description of the system and its components is provided, followed by a discussion of the operation of the same.

Figure 1:
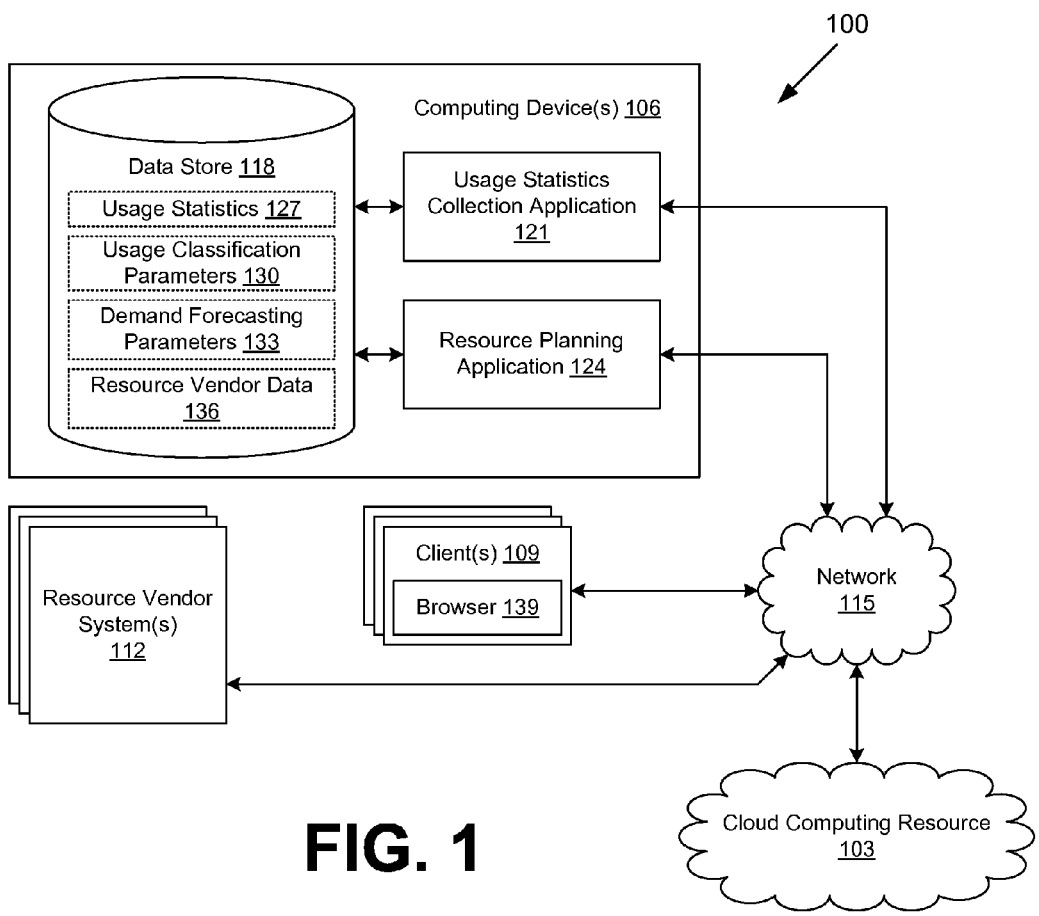
FIG. 1 is a drawing of a networked environment according to various embodiments of the present disclosure.

With reference to FIG. 1, shown is a networked environment 100 according to various embodiments. The networked environment 100 includes a cloud computing resource 103, one or more computing devices 106, one or more clients 109, and one or more resource vendor systems 112 in data communication by way of a network 115. The network 115 includes, for example, the Internet, intranets, extranets, wide area networks (WANs), local area networks (LANs), wired networks, wireless networks, or other suitable networks, etc., or any combination of two or more such networks.

Figure 2:
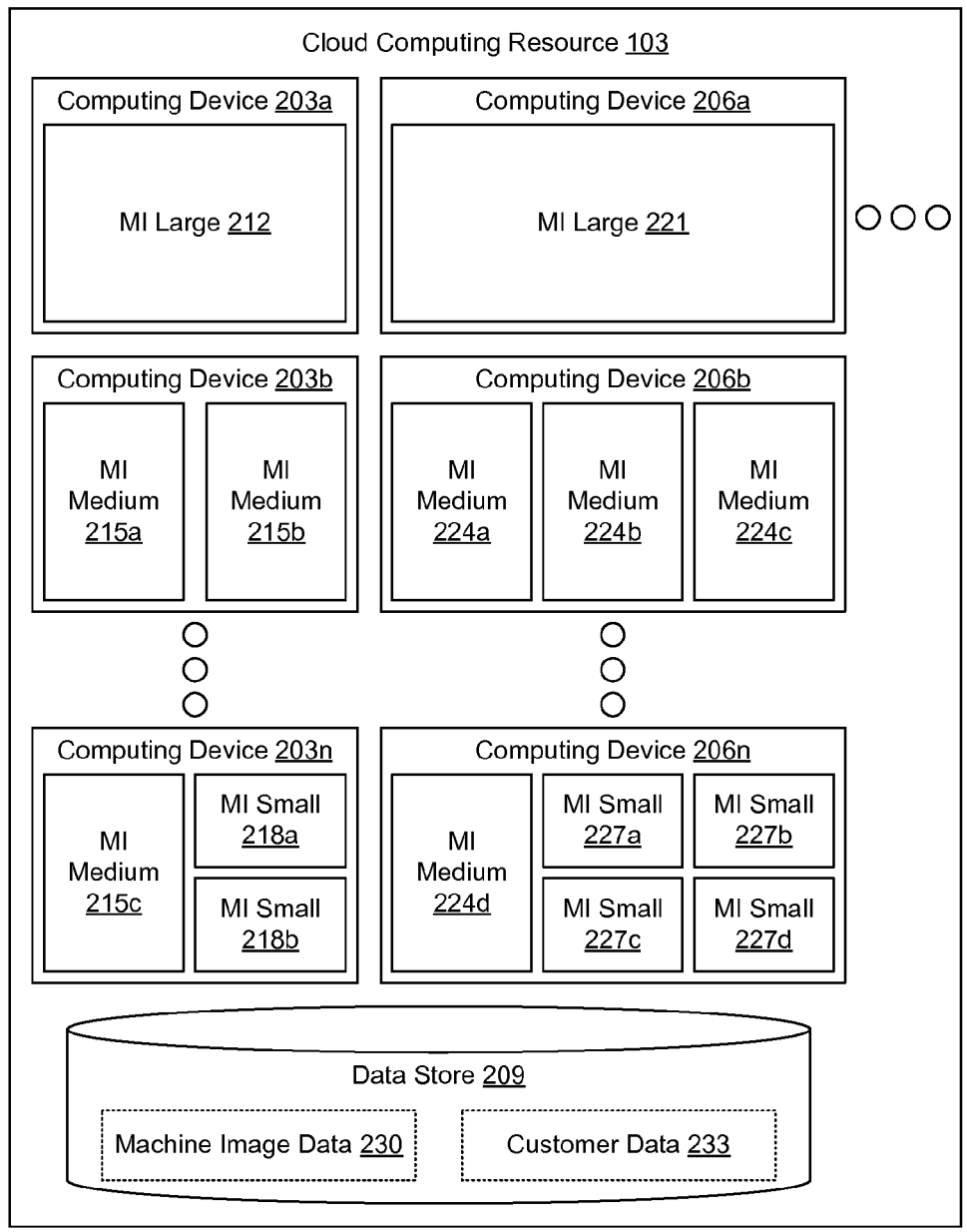
FIG. 2 is a drawing of one example of a cloud computing resource from the networked environment of FIG. 1 according to various embodiments of the present disclosure.

Referring next to FIG. 2, shown is one example of a cloud computing resource 103 according to various embodiments. The cloud computing resource 103 includes a plurality of computing devices 203a, 203b . . . 203n, a plurality of computing devices 206a, 206b . . . 206n, and a data store 209. Such components of the cloud computing resource 103 may be in data communication with each other and/or external computing devices 106 (FIG. 1) by way of a network 115 (FIG. 1). Such computing devices 203 and 206 may be located in a single installation or may be dispersed among many different geographical locations.

Computing devices 203 and 206 may correspond to differing hardware platforms in various embodiments. Accordingly, computing devices 203 and 206 may have differing hardware configurations, for example, of central processing units (CPUs), system memory, data storage, network bandwidth, and/or other hardware characteristics. In one embodiment, all computing devices 203a, 203b . . . 203n may have a first hardware configuration, while all computing devices 206a, 206b . . . 206n may have a second hardware configuration. Although only two sets of computing devices 203 and 206 are shown, it is understood that there may be any number of sets of computing devices 203 and 206 having different hardware configurations.

Each computing device 203, 206 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 GB of system memory, and 1,000 GB of data storage. Each MI medium 215 instance may have two CPU-equivalent units, 10 GB of system memory, and 500 GB of data storage. Also, each MI small 218 instance may have one CPU-equivalent unit, 5 GB of system memory, and 250 GB of data storage. In the example of FIG. 2, computing devices 206 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 206 is not intended to be limiting. In various embodiments, there may be more or fewer types of machine instances for each type of computing device 203, 206. In one embodiment, a machine instance may comprise an allocation of an entire computing device 203, 206 with no virtualization.

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 206a, three MI medium 224a, 224b, 224c instances are executing on computing device 206b, and one MI medium 224d instance and four MI small 227a, 227b, 227c, 227d instances are executing on computing device 206n. Each machine instance may be associated with a customer, though any customer may be associated with any number of machine instances.

In various embodiments, a customer may be capable of launching new machine instances and/or terminating machine instances dynamically. Thus, the cloud computing resource 103 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance. However, the operator of the cloud computing resource 103 may need to ensure that spare computing capability is available in the cloud computing resource 103 to accommodate such new machine instances. At the same time, too much spare computing capability may be costly and resource inefficient.

Various applications and/or other functionality may be executed in the machine instances and in the computing devices 203, 206 according to various embodiments. Also, various data is stored in a data store 209 that is accessible to the computing devices 203, 206. The data store 209 may be representative of a plurality of data stores 209 as can be appreciated. The data stored in the data store 209 includes, for example, machine image data 230, customer data 233, and potentially other data.

Machine image data 230 may include data used to launch a machine instance. Machine image data 230 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 233 may include customer-specific data. In one embodiment, all customer configuration data for a machine instance is stored in customer data 233. In this way, such data may be easily shared among many machine instances. As a non-limiting example, the customer data 233 may include network pages to be served up by one or more network page servers executing on machine instances associated with a customer. However, it is understood that in some embodiments customer-specific data may be stored within local data storage associated with a machine instance.

Referring back to FIG. 1, the computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise, for example, a cloud computing resource, a grid computing resource, and/or any other distributed computing arrangement. Such computing devices 106 may be located in a single installation or may be dispersed among many different geographical locations. In one embodiment, the computing device 106 represents a virtualized computer system executing on one or more physical computing systems. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 118 that is accessible to the computing device 106. The data store 118 may be representative of a plurality of data stores as can be appreciated. The data stored in the data store 118, for example, is associated with the operation of the various applications and/or functional entities described below.

The components executed on the computing device 106, for example, include a usage statistics collection application 121, a resource planning application 124, and other applications, services, processes, systems, engines, or functionality not discussed in detail herein. The usage statistics collection application 121 is executed to gather statistics regarding machine instances executing in the cloud computing resource 103. The resource planning application 124 is executed to process the statistics collected by the usage statistics collection application 121 and to determine whether additional computing resources will be necessary within the cloud computing resource 103 to meet customer demand and, if applicable, service-level requirements.

The data stored in the data store 118 includes, for example, usage statistics 127, usage classification parameters 130, demand forecasting parameters 133, resource vendor data 136, and potentially other data. The usage statistics 127 include data regarding resource usage of customers within the cloud computing resource 103. The usage statistics 127 may include data regarding when machine instances were launched and terminated by a customer, numbers of machine instances of a customer at time intervals, resource usage of the machine instances at time intervals, and/or any other data relating to the resource usage of a customer within the cloud computing resource 103.

The usage classification parameters 130 may be used to classify customers according to one or more predefined customer usage classifications. In one embodiment, customers may be classified as having either stable usage or unstable usage relating to the cloud computing resource 103. It is understood that there may be any number of customer usage classifications in other embodiments. In one embodiment, the usage classification parameters 130 may define a threshold number of machine instances such that a customer is classified as having stable usage when the number of machine instances associated with the customer does not meet or exceed the threshold during a predefined time period. In one embodiment, the usage classification parameters 130 may define a threshold for a relative deviation from a straight line that is fitted to the usage statistics 127 for a customer such that usage meeting or exceeding the threshold is classified as unstable or spiky usage.

The demand forecasting parameters 133 may be used by the resource planning application 124 in determining how demand for computing resources in the cloud computing resource 103 is forecasted from the usage statistics 127. In various embodiments, the demand forecasting parameters 133 may control the ordering of specific physical components, for example, complete computing devices 203, 206 (FIG. 2), CPUs, motherboards, system memory, hard drives, etc., used in providing computing resources to customers in the cloud computing resource 103.

The resource vendor data 136 includes data regarding one or more resource vendors who supply computing devices 203, 206 and/or other physical components used in the cloud computing resource 103. Such resource vendor data 136 may include component inventory, lead time between the time an order for a component is placed and the time the component is predicted to arrive at a specified location, vendor location, component cost, component quality and reliability, and/or other data.

The client 109 is representative of a plurality of client devices that may be coupled to the network 115. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may be configured to execute various applications such as a browser 139 and/or other applications. The browser 139 may be executed in a client 109, for example, to access and render network pages, such as web pages, or other network content served up by the cloud computing resource 103, the computing device 106, and/or other servers. The client 109 may be configured to execute applications beyond browser 139 such as, for example, email applications, instant message applications, and/or other applications.

The resource vendor systems 112 are computing systems configured to receive and process orders for computing devices 203, 206 and/or other physical components of the cloud computing resource 103 for one or more resource vendors. It is understood that the resource vendor systems 112 are an optional feature of the networked environment 100. In some situations, a resource vendor may receive orders by phone or by paper, but not electronically. In such situations, the resource planning application 124 may be configured to provide ordering information to a user so that an order may be placed manually with a resource vendor. The resource vendor systems 112 may also provide updated component inventory, prices, delivery estimates, and/or other data to be used by the resource planning application 124 or a user in making a purchasing decision.

Next, a general description of the operation of the various components of the networked environment 100 is provided. To begin, a customer at a client 109 configures one or more machine instances to be launched within the cloud computing resource 103. The machine instances may be launched manually by the customer or programmatically. The customer may specify a type of machine instance, operating system, hardware platform, etc., according to availability in the cloud computing resource 103 and preferences of the customer. The customer configures the machine instances to host applications and data as desired.

The machine instances thereby use computing resources of the cloud computing resource 103. As applications execute and data is stored, the quantity of computing resources used in the cloud computing resource 103 varies over time. Further, the launching of new machine instances and termination of existing machine instances may respectively reserve or free computing resources in the cloud computing resource 103.

Meanwhile, the usage statistics collection application 121 may monitor the cloud computing resource 103 for various statistics regarding the number of machine instances executing in the cloud computing resource 103 and their resource consumption. Such monitoring may be performed periodically. Such monitoring may also be event-driven, triggered by such events as, for example, launching or terminating machine instances and other events. In one embodiment, the computing devices 203, 206 may include monitoring logic that reports statistics to the usage statistics collection application 121. In one embodiment, the usage statistics collection application 121 may be integrated with a billing system to bill customers for their usage.

The resource planning application 124 may be executed manually or automatically. As a non-limiting example, the resource planning application 124 may be configured to execute automatically at a predefined time interval. As another non-limiting example, the resource planning application 124 may be configured to execute automatically in response to an event such as, for example, available resources in the cloud computing resource 103 falling below a specified amount, or some other event.

The resource planning application 124 may be configured to populate the resource vendor data 136 with empirically determined data, automatically obtained data, user-provided data, and other data. The resource planning application 124 or some other application may be configured to keep the resource vendor data 136 updated on an ongoing basis. Additionally, the resource planning application 124 may receive and store updates to the usage classification parameters 130 and the demand forecasting parameters 133 from a user at a client 109.

The resource planning application 124 is configured to process the usage statistics 127 into one or more usage groups. The usage groups are determined based at least in part on the customer usage classifications according to the usage classification parameters 130. The usage groups may also be determined according to other attributes such as, for example, type of hardware platform, machine instance type, operating system, and so on. The resource planning application 124 generates a demand forecast for each of the usage groups.

As a non-limiting example, the customer usage classifications may include stable usage and unstable usage. Resource demand may be calculated differently as desired for stable usage and unstable or spiky usage. For instance, it may not be profitable to order additional computing resources simply to satisfy unstable demand.

The resource planning application 124 calculates a projected demand for one or more physical components of the cloud computing resource 103 according to the demand forecasts for the usage groups. In one embodiment, the projected demand may be calculated based at least in part on a different minimum service level associated with each one of the customer usage classifications. The minimum service levels may correspond to service-level agreements promised to customers.

From the projected demands, the resource planning application 124 may calculate an order quantity for one or more physical components. In one embodiment, the resource planning application 124 is configured to submit an order to a resource vendor electronically by way of the network 115 to a resource vendor system 112. The order quantity may be based at least in part on a lead time associated with the resource vendor. In one embodiment, the resource vendor may be selected automatically according to a lead time, a cost, and other factors associated with the resource vendor and the physical component(s) to be ordered. In some embodiments, the resource planning application 124 may notify a user at client 109 of the calculated order quantity. Subsequently, the user may place an order for the physical components with a resource vendor.

The resource planning application 124 may be configured to notify a customer at a client 109 of their past usage and/or projected usage according to a demand forecast generated for the customer. Such a notification may be made by way of a network page, email, phone call, text message, or other communication sent to the client 109.

Figure 3:
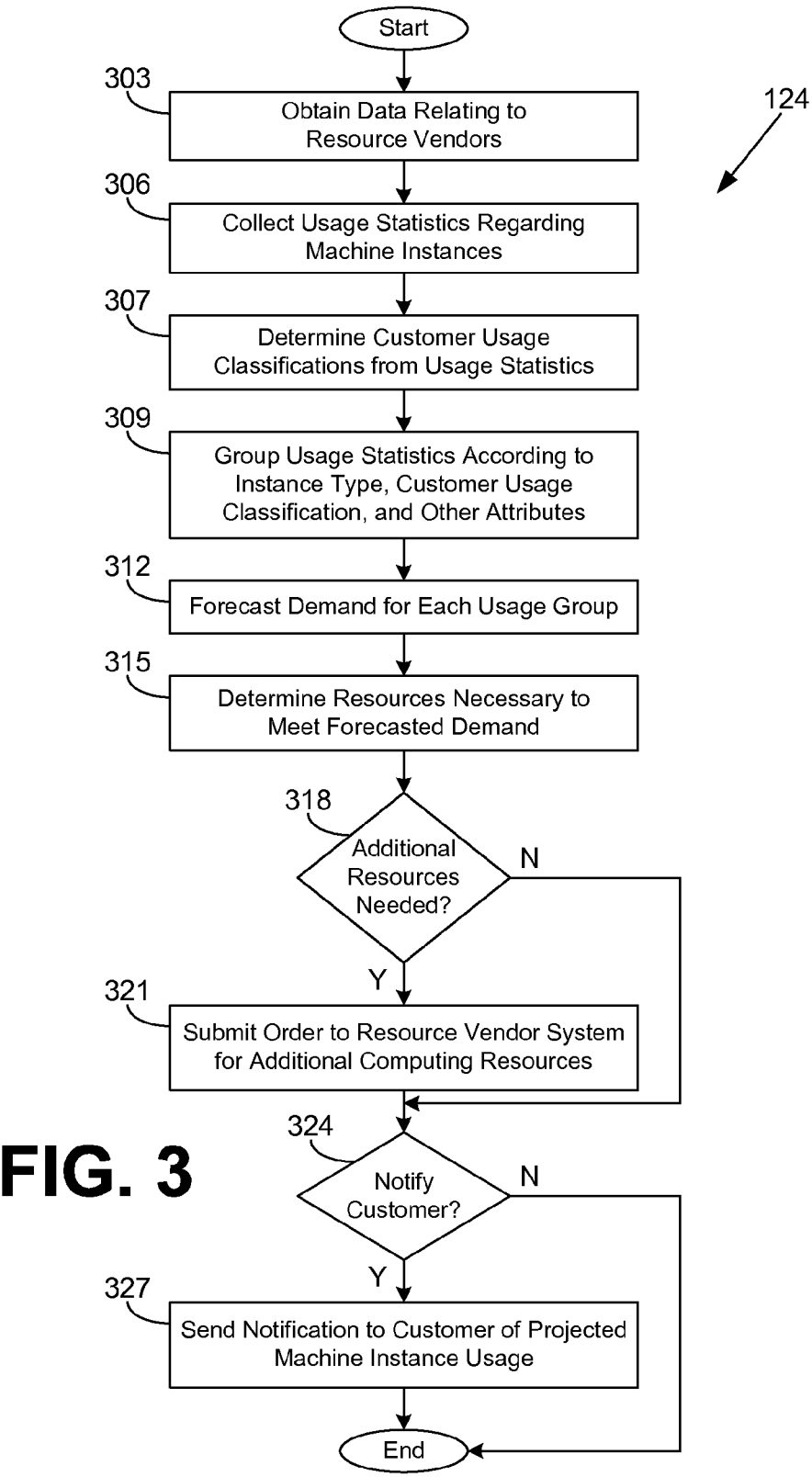
FIG. 3 is a flowchart illustrating one example of functionality implemented as one or more portions of a resource planning application executed in a computing device in the networked environment of FIG. 1 according to various embodiments of the present disclosure.

Referring next to FIG. 3, shown is a flowchart that provides one example of the operation of a portion of the resource planning application 124 according to various embodiments. It is understood that the flowchart of FIG. 3 provides merely an example of the many different types of functional arrangements that may be employed to implement the operation of the portion of the resource planning application 124 as described herein. As an alternative, the flowchart of FIG. 3 may be viewed as depicting an example of steps of a method implemented in the computing device 106 (FIG. 1) according to one or more embodiments.

Beginning with box 303, the resource planning application 124 may obtain data relating to one or more resource vendors that are capable of supplying computing resource components for the cloud computing resource 103 (FIG. 1). Such data may include a variety of information about the resource vendor, including, for example, component inventory, prices, estimated delivery times, and so on. The data may also be empirically determined and/or manually entered, to include such data as, for example, lead time for components, vendor location, and so on. The data relating to the resource vendor(s) may be stored in resource vendor data 136 (FIG. 1).

In box 306, the resource planning application 124 may collect usage statistics 127 (FIG. 1) regarding machine instances executing in the cloud computing resource 103. In one embodiment, the actual collection of the usage statistics 127 may be performed by the usage statistics collection application 121 (FIG. 1). The usage statistics collection application 121 may poll the computing devices 203, 206 (FIG. 2) of the cloud computing resource 103 for information, or the information may be reported to the usage statistics collection application 121 as desired. The resource planning application 124 then processes at least a portion of the usage statistics 127. In box 307, the resource planning application 124 may determine customer usage classifications for customers based at least in part on the usage statistics 127. As a non-limiting example, customers may be classified as having stable or unstable usage.

In box 309, the resource planning application 124 may group the usage statistics 127 according to type of machine instance, customer usage classification, type of operating system or disk image, type of hardware platform, and/or other attributes. In one embodiment, the resource planning application 124 groups the usage statistics 127 according to all of the following, in the sequence given: type of hardware platform, type of machine instance, type of operating system, and customer usage classification, where the customer usage classification is stable usage or unstable usage. The resource planning application 124 thereby produces one or more usage groups according to the usage statistics 127.

Next, in box 312, the resource planning application 124 forecasts the usage demand for each one of the usage groups produced in box 309. The forecasting may be configured by the demand forecasting parameters 133 (FIG. 1). The demand forecasting parameters 133 may vary based upon hardware platform and other attributes associated with usage groups. As a non-limiting example, the resource planning application 124 computes the average usage for each day for a predefined time period. The resource planning application 124 may fit a growth regression model to the average usage time series. Such growth regression models may include an exponential growth curve, a quadratic growth curve, a linear growth curve, or some other model. Further, the resource planning application 124 may fit an error model to the average usage time series after fitting the growth model. The choice of growth model may be made based at least in part on forecasting accuracy metrics such as, for example, the mean absolute percentage error (MAPE) metric, forecast distribution bias, achieved service level, and other metrics.

Thereafter, in box 315, the resource planning application 124 determines the computing resources necessary in order to meet the forecasted demand from box 312. Although demand may be forecasted in box 312 for different usage groups that use the same hardware platform, in box 315, the resource planning application 124 may aggregate the predicted demands according to the underlying hardware platform to be used, as desired. The determination of box 315 may also be configured by way of the demand forecasting parameters 133. In one embodiment, specified service levels for customers may also be taken into account in determining the computing resources necessary in order to meet the forecasted demand.

In box 318, the resource planning application 124 determines whether additional computing resources are needed. If additional resources are needed, the resource planning application 124 proceeds to box 321 and submits one or more orders to one or more resource vendor systems 112 (FIG. 1) for the additional computing resources for the cloud computing resource 103. In other embodiments, the resource planning application 124 may generate a network page, email, or other communication to inform a user at a client 109 (FIG. 1) that additional computing resources should be manually ordered. The resource planning application 124 then moves to box 324.

Alternatively, the resource planning application 124 may determine in box 318 that additional resources are not needed. As a non-limiting example, the service-level agreement associated with a customer usage classification may specify that a predicted availability and performance of the cloud computing resource 103 are sufficient. When additional resources are not needed, the resource planning application 124 moves to box 324.

In box 324, the resource planning application 124 determines whether a customer is to be notified. If a customer is to be notified, the resource planning application 124 proceeds to box 327 and sends a notification to one or more customers at a client 109. The notification may embody information about the past and predicted resource usage of the customer, which may be helpful to the customer in modifying the behavior of applications of the customer executing in the cloud computing resource 103, for example, to reduce a number of machine instances to control cost. Thereafter, the resource planning application 124 ends. If a customer is not to be notified, the resource planning application 124 also ends.

Figure 4:
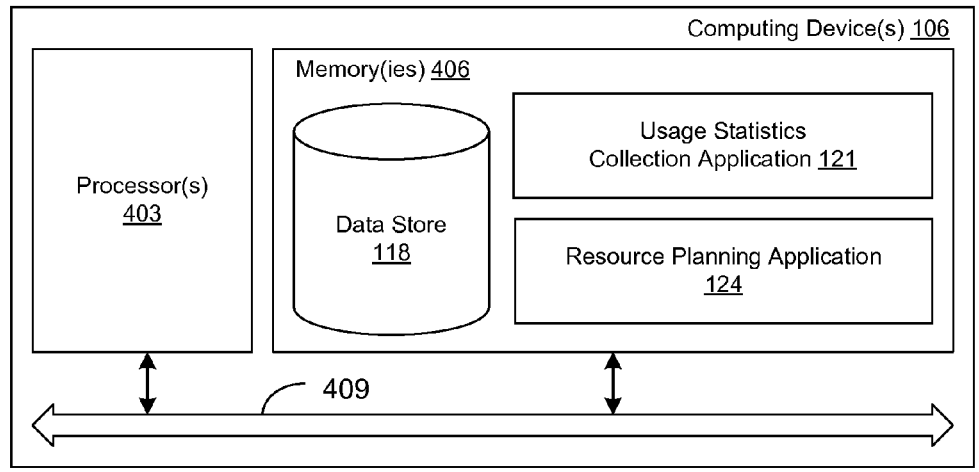
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 106 according to an embodiment of the present disclosure. The computing device 106 includes at least one processor circuit, for example, having a processor 403 and a memory 406, both of which are coupled to a local interface 409. To this end, the computing device 106 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the usage statistics collection application 121, the resource planning application 124, and potentially other applications. Also stored in the memory 406 may be a data store 118 and other data. In addition, an operating system may be stored in the memory 406 and executable by the processor 403.

Figure 5:
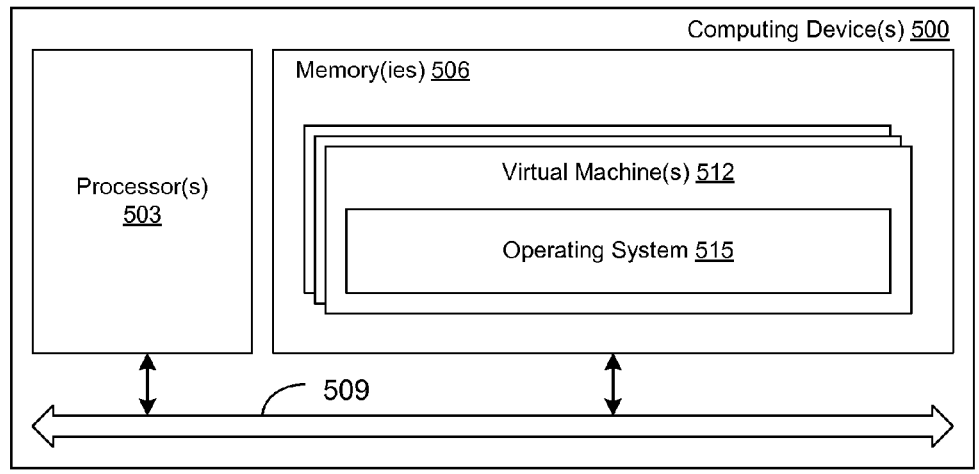
FIG. 5 is a schematic block diagram that provides one example illustration of a computing device employed in the cloud computing resource of FIG. 2 according to various embodiments of the present disclosure.

Turning now to FIG. 5, shown is a schematic block diagram of a computing device 500 according to an embodiment of the present disclosure. The computing device 500 is representative of a computing device 203, 206 (FIG. 2) used in the cloud computing resource 103 (FIG. 1). The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are one or more virtual machines 512 and potentially other applications. Each virtual machine 512 is representative of an instance of a virtual machine such as, for example, MI large 212, 221 (FIG. 2), etc., executing in the computing device 500. Each virtual machine 512 may include an operating system 515 executable in the virtual machine 512 and any number of other applications and data. In addition, an operating system may be stored in the memory 506 and executable by the processor 503.

With reference to both FIGS. 4 and 5, it is understood that there may be other applications that are stored in the memories 406, 506 and are executable by the processors 403, 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memories 406, 506 and are executable by the processors 403, 503. In this respect, the term "executable" means a program file that is in a form that can ultimately be run by the processors 403, 503. Examples of executable programs may be, for example, a compiled program that can be translated into machine code in a format that can be loaded into a random access portion of the memories 406, 506 and run by the processors 403, 503, source code that may be expressed in proper format such as object code that is capable of being loaded into a random access portion of the memories 406, 506 and executed by the processors 403, 503, or source code that may be interpreted by another executable program to generate instructions in a random access portion of the memories 406, 506 to be executed by the processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406, 506 are defined herein as including both volatile and nonvolatile memory and data storage components. Volatile components are those that do not retain data values upon loss of power. Nonvolatile components are those that retain data upon a loss of power. Thus, the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 403, 503 may represent multiple processors 403, 503 and the memories 406, 506 may represent multiple memories 406, 506 that operate in parallel processing circuits, respectively. In such a case, the local interfaces 409, 509 may be an appropriate network 115 (FIG. 1) that facilitates communication between any two of the multiple processors 403, 503, between any of the processors 403, 503 and any of the memories 406, 506, or between any two of the memories 406, 506, etc. The local interfaces 409, 509 may comprise additional systems designed to coordinate this communication, including, for example, performing load balancing. The processors 403, 503 may be of electrical or of some other available construction.

Although the usage statistics collection application 121, the resource planning application 124, the virtual machines 512, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of one or more portions of the resource planning application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 403, 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the usage statistics collection application 121, the resource planning application 124, and the virtual machines 512, that comprises software or code can be embodied in any non-transitory computer-readable medium for use by or in connection with an instruction execution system such as, for example, processors 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed, the program causes the at least one computing device to at least:
   receive usage statistics for a plurality of virtual machine instances executing in a networked plurality of computing devices over a time period, individual ones of the plurality of virtual machine instances being associated with a respective customer, the respective customer being capable of terminating existing customer-associated ones of the plurality of virtual machine instances and launching new customer-associated ones of the plurality of virtual machine instances;
   produce a plurality of usage groups by grouping the usage statistics according to at least one of: a computing device type, a virtual machine instance type, an operating system type, or a customer usage classification;
   generate corresponding demand forecasts for individual ones of the plurality of usage groups; and
   calculate a projected demand for at least one physical component of the networked plurality of computing devices according to the corresponding demand forecasts.

2. The non-transitory computer-readable medium of claim 1, wherein when executed, the program further causes the at least one computing device to at least classify the usage statistics associated with a respective customer as stable usage when a deviation from a straight line of a plot of the usage statistics associated with the respective customer over a predefined time period is under a threshold.

3. The non-transitory computer-readable medium of claim 1, wherein when executed, the program further causes the at least one computing device to at least classify the usage statistics associated with a respective customer as unstable usage when a deviation from a straight line of a plot of the usage statistics associated with the respective customer over a predefined time period meets a threshold.

4. The non-transitory computer-readable medium of claim 1, wherein when executed, the program further causes the at least one computing device to at least classify the usage statistics associated with a respective customer as stable usage when a quantity of a subset of the plurality of virtual machine instances that are associated with the respective customer is below a threshold during a predefined time period.

5. The non-transitory computer-readable medium of claim 1, wherein when executed, the program further causes the at least one computing device to at least determine an order quantity for the at least one physical component based at least in part on the projected demand and a lead time associated with a resource vendor.

6. The non-transitory computer-readable medium of claim 1, wherein the networked plurality of computing devices are associated with a plurality of different hardware platforms, individual ones of the plurality of different hardware platforms having a corresponding capacity for individual ones of a plurality of types of virtual machine instances.

7. A system, comprising:
   at least one computing device; and
   an application executable in the at least one computing device, the application being configured to at least:

generate a plurality of usage groups by grouping usage statistics regarding a plurality of virtual machine instances executing in a networked plurality of computing devices, the usage statistics being grouped based at least in part on a virtual machine instance type, individual ones of the plurality of virtual machine instances being associated with a respective customer, the respective customer being capable of terminating existing customer-associated ones of the plurality of virtual machine instances and launching new customer-associated ones of the plurality of virtual machine instances;

generate corresponding demand forecasts for individual ones of the plurality of usage groups; and calculate a projected demand for at least one physical component of the networked plurality of computing devices according to the corresponding demand forecasts.

8. The system of claim 7, wherein the usage statistics are grouped further based at least in part on a customer usage classification.

9. The system of claim 8, wherein the customer usage classification is selected from a plurality of customer usage classifications, the plurality of customer usage classifications including stable usage and unstable usage, a respective customer is classified as having unstable usage when a deviation from a straight line of a plot of the usage statistics associated with the respective customer over a predefined time period meets a first threshold, and the respective customer is classified as having stable usage when the deviation is below the first threshold.

10. The system of claim 9, wherein the respective customer is classified as having stable usage when a quantity of a subset of the plurality of virtual machine instances that are associated with the respective customer is below a second threshold during the predefined time period.

11. The system of claim 7, wherein the usage statistics are grouped further based at least in part on an operating system type.

12. The system of claim 7, wherein the application is further configured to at least send a notification to the respective customer of a quantity of virtual machine instances predicted to be used by the respective customer based at least in part on at least one of the corresponding demand forecasts.

13. A method, comprising:

providing, via at least one of one or more computing devices, a plurality of usage statistics regarding a plurality of virtual machine instances executing in a networked plurality of computing devices;

generating, via at least one of the one or more computing devices, corresponding demand forecasts for individual ones of a plurality of usage groups, the plurality of usage groups individually including a subset of the plurality of usage statistics that are associated with a corresponding customer usage classification from a plurality of customer usage classifications; and calculating, via at least one of the one or more computing devices, a projected demand for at least one physical component of the networked plurality of computing devices according to the demand forecasts.

14. The method of claim 13, wherein at least one of the plurality of usage groups is associated with a corresponding hardware platform, a corresponding virtual machine instance type, and a corresponding operating system.

15. The method of claim 13, further comprising classifying, via at least one of the one or more computing devices, a subset of the plurality of usage statistics as corresponding to unstable usage when a deviation from a straight line of a plot of the subset of the plurality of usage statistics over a predefined time period meets a threshold, the subset of the plurality of usage statistics being associated with a respective customer.

16. The method of claim 13, further comprising classifying, via at least one of the one or more computing devices, a subset of the plurality of usage statistics as corresponding to stable usage when a deviation from a straight line of a plot of the subset of the plurality of usage statistics over a predefined time period is under a threshold, the subset of the plurality of usage statistics being associated with a respective customer.

17. The method of claim 13, wherein the plurality of usage statistics relate to at least one of: a quantity of the plurality of virtual machine instances or a resource consumption of the plurality of virtual machine instances.

18. The method of claim 13, further comprising determining, via at least one of the one or more computing devices, an order quantity for the at least one physical component based at least in part on the projected demand and a lead time associated with a resource vendor.

19. The method of claim 13, wherein the projected demand is calculated based at least in part on different minimum service levels associated with individual ones of the plurality of customer usage classifications.

20. The method of claim 13, wherein individual ones of the plurality of virtual machine instances are associated with a respective customer, the respective customer being capable of terminating existing customer-associated ones of the plurality of virtual machine instances and launching new customer-associated ones of the plurality of virtual machine instances.

* * * * *